Patented Oct. 25, 1949

2,485,934

UNITED STATES PATENT OFFICE 2,485,934

ALGINATE ICE-CREAM STABILIZING COMPOSITION

Arnold B. Steiner, La Jolla, Calif., assignor to Kelco Company, San Diego, Calif., a corporation of Delaware No Drawing. Application October 21, 1946, Serial No. 704,791

6 Claims. (Cl. 99—136)

This invention relates to the use of water-soluble alginates in stabilizing frozen milk products, and specifically to an ice cream stabilizing composition of which the essential component is an alkali metal salt of alginic acid.

The purpose of the invention is to provide an ice cream stabilizer having most of the advantages and useful properties of gelatine, with none of the disadvantages inherent in the use of that agent. The further purpose of the invention is to provide an ice cream stabilizer which in certain respects is a material improvement over the alignate stabilizers heretofore made.

Manufactured milk products such as ice cream, ice milk, chocolate milk and processed cheese are commonly made with the addition of a small proportion of a stabilizer. The agents commonly used for that purpose include the natural water-soluble gums, gelatine and the alginates.

Stabilizers are used in ice cream to impart a desirable body and smooth texture to the frozen product and to inhibit the growth of ice crystals in storage. In chocolate milk the primary function of the stabilizer is to prevent the cocoa or chocolate from settling, while in processed cheese it is to give a desirable body and prevent serum drainage from the finished product. The natural water-soluble gums find some use for these purposes but the greater part of the stabilizer used in the ice cream industry consists either of gelatine or of a sodium alginate composition.

A stabilizer for ice cream must be fully functional as regards development of the desired body and texture, in promoting rapid and sufficient overrun and in inhibiting crystal growth. Gelatine and the alginates are both satisfactory in these respects. Further, a stabilizer for this purpose should be reasonable in cost, should be convenient to handle and to introduce into the ice cream mix, should be free from any tendency to impart or develop a foreign or undesirable flavor, and should be free from characteristics which interfere with the manufacture of the frozen products or increase the cost of fabrication. It is in these respects that gelatine and the alginates are competitive, each having advantages and compensating disadvantages.

The properties of gelatine are such that it may if desired be added to the ice cream mix without intermixture with any other substance, but the water-soluble alginates have certain properties which render them unsuitable for addition to the mix until they have been blended. Alginate actually used for this purpose appears in the form of a composition manufactured in accordance with the disclosure of United States Patent 2,097,228 to Howard J. Lucas. Briefly this composition contains about one-half of its weight of sodium alginate, the balance being sugar and/or dextrine to assist in dispering the alginate through the mix and to standardize the stabilizing property, together with a minor proportion of a water-soluble salt of phosphoric acid having the purpose of rendering the alginate compatible with the calcium salts present in milk.

While Lucas does not particularize as to the viscosity-producing characteristic of the alginate which he uses, it has been established with reasonable certainty that the stabilizing value of gelatine is dependent on, or at least closely parallel with the gel strength of its aqueous solutions. From analogy it was assumed that the value of the milk soluble alginate of Lucas was dependent on the viscosity of its milk solutions, and on that assumption all milk-soluble stabilizing compositions made under this patent have been standardized to produce an ice cream mix which becomes viscous on cooling and have been blends of a "high viscosity" algin, i. e., an alginate having a high viscosity-producing characteristic.

The composition of the present invention is identical with that above described with the single exception that a "low viscosity" algin i.e., one having only a slight viscosity-producing characteristic, is substituted for the high viscosity algin heretofore used. The surprising results following from this substitution are set forth in detail hereinafter, together with the necessary definitions. In the following disclosure, for the sake of convenience, the composition heretofore made and sold is referred to as "old composition" while the composition of the invention, based on a low viscosity algin, will be referred to as "new composition."

COMPARISONS BETWEEN GELATINE AND ALGINS

The principal advantages over the algins in the use of a gelatine stabilizer are its ready solubility in water or milk at less than pasteurization temperature, and the low viscosity of its solutions which cause the mix to flow rapidly in thin films over the cooler. Its principal drawbacks are its greater cost per unit of effectiveness, its effect in retarding the whipping of the mix, and the fact that the mix must be aged for from four to twenty-four hours between cooling and freezing. Gelatine also often causes the ice cream in which it is used to develop an unpleasant "stale" flavor.

By way of comparison, the alginate stabilizers maintain the clean and fresh flavor of the ice cream; the mix requires no aging, the whipping and stabilizing ability being developed immediately on cooling; the alginate mix whips better than a gelatine stabilized mix, and the stabilizing value of the algins is superior to that of gelatine.

The undesirable properties of the alginate stabilizers are heretofore made are not such as to reduce its stabilizing value but are such as to render it less convenient to use than gelatine and such as to interfere with the smooth progress of the mix through the steps of manufacture of the frozen product. In brief, these undesirable characteristics are as follows:

(a) The relatively high temperature required to bring the stabilizer into solution in the mix;

(b) The slow and viscid flow of the mix over the cooler and the attendant lowering of the cooling rate;

(c) A certain degree of susceptibility to the action of salts occurring in varying quantities in milk from different sources and at different seasons;

(d) Incompatibility with mixes having a developed acidity, requiring neutralization of the mix.

As described in detail in connection with the experiments following, the drawbacks to the use of the old composition are sharply mitigated or entirely avoided in the new product, which retains all the desirable characteristics of the old product while coming to a parity with gelatine as to the features in which that agent formerly had the advantage.

SOLUTION TEMPERATURES

Solution of the old composition in an ice cream mix is slow and imperfect if the temperature be less than about 160° Fahr. and at lower temperatures, even with extended time, the full efficiency of the stabilizer is not developed. This is especially true under adverse conditions, such as poor mechanical agitation in the pasteurizing vats or the use of slightly lower temperatures.

The new composition, based on low viscosity algin, is more soluble than the old and more readily dissolves under adverse conditions. The solution rate increases as the viscosity of the alginic component is lowered, and the lower viscosity compositions are soluble in cold milk.

The new composition, in the preferred viscosity range, is soluble in not more than five minutes at 120° Fahr. and therefore is readily soluble under pasteurization conditions. In this respect the new product is fully on a parity with gelatine.

EFFECTS ON COOLING RATE

The increased effectiveness of the cooling step which follows reduction of viscosity of alginate-stabilized mixes is shown by the results of the following experiments:

Mixes containing 12% to 14% butter fat, 10% serum solids and 15% sugar were stabilized each with 0.25% of compositions standardized to produce various viscosities of mix. To avoid uncertainty as to solubility each mix was brought to 160° Fahr., the stabilizer added and the mix held at that temperature for thirty minutes. The mixes were then homogenized at 2500# pressure and poured over a surface cooler, alternating mixes of high and low viscosity without change in feed rate. The temperature of each mix was determined as it came off the cooler and pipette viscosities taken on the cooled mixes. These viscosities, in seconds, are arbitrary but are strictly comparable for this set of determinations. The results obtained are shown in Table 1 below:

Table 1

| Test No. | Old Composition | | New Composition | | Difference | |
|---|---|---|---|---|---|---|
| | Vis. | Temp. | Vis. | Temp. | Vis. | Temp. |
| | Sec. | Deg. | Sec. | Deg. | Sec. | Deg. |
| 1 | 47 | 52 | 25 | 44 | −22 | −8 |
| 2 | 47 | 54 | 26 | 45 | −21 | −9 |
| 3 | 55 | 47 | 32 | 40 | −23 | −7 |
| 4 | 62 | 48 | 42 | 43 | −20 | −5 |
| 5 | 44 | 36 | 25 | 32 | −19 | −4 |
| 6 | 51 | 38 | 32 | 32 | −19 | −6 |

These results show that the mixes stabilized with the improved alginate were so much more fluent that they cooled to a temperature ranging from 4° to 9° below that of the mixes stabilized with high viscosity composition. The low viscosity mixes flowed on the average about 40% faster than mixes stabilized with the regular alginate.

The faster cooling renders the new composition more convenient and efficient than that heretofore produced and the lower temperature attained under identical conditions reduces the time and work expended in further cooling the mix to freezing temperature. In the use of the high viscosity composition it has often occurred that the cooler troughs overflowed by reason of the excessive thickness of the cooled mix, requiring the entire cooling operation to be slowed down.

Mixes stabilized with the new, low viscosity composition resemble gelatine-stabilized mixes in free and even flow over the cooler and in complete drainage, thus gaining a major advantage heretofore obtainable only in the use of gelatine and not realizable with alginate compositions.

EFFECTS OF VARYING CONTENT OF SALTS

When milks from different localities are analyzed wide variations in the salt content are found. This variation also follows change of season as well as change of locality. For example, the total phosphorus content of milk (as $P_2O_5$) has been reported as ranging from a low of 0.108% to a high of 0.330%. While part of this phosphorus is in organic combination in the casein, globulin and phospholipids, the greater part is in the form of inorganic phosphates. The citric salts, expressed as citric acid, vary from a low of 0.070% to a high of 0.400%.

The phosphates, citrates and lactates, occurring in part as calcium salts, produce a marked but highly uncertain variation in the viscosity of the mixes stabilized with the old composition. This change in viscosity is less objectionable per se than in the fact that, being a variable with milks of different constitutions, it cannot be predicted and allowed for in standardizing the stabilizer.

It is thus highly desirable to reduce to the greatest possible extent the effects of varying salt content on mix viscosity, a result which is produced in the substitution of a low viscosity for a high viscosity algin in the stabilizing composition. This is illustrated in the following experiments.

Samples of 500 cubic centimeters of skim milk were heated in electrically heated hot cups to 160° F. while stirring at 800 R. P. M. by means of a mechanical stirrer. The 1.545 grams of alginate stabilizer, equivalent to 0.3% by weight of the milk, was dry-mixed with 5 grams of sugar and the various small proportions of salts listed in the table below. This (stabilizer) mixture was added to the 500 cubic centimeters of hot milk and the stirring and temperature was maintained for another half hour. To complete the pasteurization of the milk the samples were poured over a small surface cooler which cooled the milk to about 42° F. The samples were bottled and stored in a refrigerator maintained at about the same temperature.

After one hour of storage in the refrigerator the milks were poured through a chilled short stem glass funnel of 3/16" bore to break any gel which might have formed and after another hour's storage the viscosities were determined. This was done by warming the milk to exactly 20° C. and timing the flow through a 100 cubic centimeter calibrated pipette having a range of 1 to 8 centipoises.

*Table 2*

| Kind of Salt | Per Cent Added | Old composition | | | New composition | | |
|---|---|---|---|---|---|---|---|
| | | Vis., Cp. | Increase Cp. | Increase Per Cent | Vis., Cp. | Increase Cp. | Increase Per Cent |
| | None | 5.3 | | | 3.8 | | |
| Sodium Citrate | 0.05 | 6.0 | 0.7 | 13 | 4.1 | 0.3 | 7 |
| | 0.10 | 6.7 | 1.4 | 26 | 4.1 | 0.3 | 7 |
| | 0.15 | 7.6 | 2.3 | 43 | 4.1 | 0.3 | 7 |
| | 0.20 | 7.8 | 2.5 | 47 | 4.1 | 0.3 | 7 |
| Di-Sodium Phosphate | 0.05 | 6.7 | 1.4 | 26 | 3.9 | 0.1 | 3 |
| | 0.10 | 7.0 | 1.5 | 32 | 4.0 | 0.2 | 5 |
| | 0.15 | 7.7 | 2.4 | 45 | 3.8 | 0.0 | 0 |
| | None | 5.3 | | | 4.8 | | |
| Sodium Hexametaphosphate | 0.05 | 5.6 | 0.3 | 6 | 4.8 | 0.0 | 0 |
| | 0.10 | 7.1 | 1.8 | 34 | 5.1 | 0.3 | 6 |
| | 0.15 | 6.9 | 1.6 | 30 | 4.9 | 0.1 | 2 |

These figures show clearly that in the use of the high viscosity algins a wholly normal variation in salt content may produce a very large change in the viscosity of the milk to which the stabilizer is added, while in the use of the low viscosity algins the change in viscosity occasioned by salt addition is insignificant. Thus the low viscosity composition, being insensitive to salt content variations, may be standardized to produce a desired viscosity of mix, regardless of milk source, while the high viscosity composition cannot.

In instances in which acidity is developed in the mix (by souring) it is common practice to add basic salts to offset the acidity, thus further adding to the difficulty experienced in standardizing salt-sensitive stabilizers.

EFFECTS OF MILK ACIDITY ON SOLUBILITY

The acidity of the milk has an important effect in determining the solubility of high viscosity alginates. Normal acidity, determined by titration with an alkali and expressed as lactic acid, is ordinarily about 0.20% for a mix containing 11% serum solids and increases as the serum solids increase. The normal acidity of condensed milk may be as high as 0.50% lactic acid.

When the titratable acidity of a mix is high, indicating developed acidity, a high viscosity alginate stabilizer is not completely dissolved. With incomplete solution the effectiveness of the stabilizer falls off rapidly and clots appear, in some cases forming gelatinous masses on the screens of the homogenizer.

In order to ascertain the effect of varying degrees of acidity on the solubilities of the two stabilizing products, samples of skim milk at different acidities were brought to various temperatures with the addition to each of 0.4% of the stabilizer, and stirred for five minutes after the addition.

The sample thus treated was poured over a glass plate to permit observation of the degree of solubility (indicated by absence of clotting) and if solution was not substantially complete, the entire experiment was repeated at 10° higher temperature, using a fresh sample of milk. In the table below only the temperature at which solution was substantially complete is entered, the stabilizer being insoluble or incompletely soluble at lower temperatures.

*Table 3*

| Milk Acidity as Lactic Acid | Composition Type | Composition[1] Viscosity | Temperature of Solubility |
|---|---|---|---|
| 0.27% | Old | 5.2 | Not at 160° F. |
| | New | 3.5 | 160° F. |
| 0.18% | Old | 5.2 | 150° F. |
| | New | 4.3 | 130° F. |
| | ...do | 4.1 | 120° F. |
| 0.16% | Old | 6.0 | Not at 160° F. |
| | ...do | 5.2 | 150° F. |
| | New | 3.8 | 130° F. |
| | ...do | 3.5 | 120° F. |
| | ...do | 3.1 | 110° F. |
| | ...do | 2.6 | 80° F. |
| | ...do | 2.3 | 60° F. |

[1] Viscosity in centipoises of an 0.3% solution in milk.

The first milk sample was naturally soured and would have required neutralization in any case. With mixes of lower acidity, neutralization would have been required in the use of the high viscosity stabilizer but would have been unnecessary with the stabilizer of low viscosity.

EFFECTS OF AGING ON LOW VISCOSITY MIXES

It is characteristic of gelatine-stabilized mixes to increase in viscosity after cooling, at a rather slow rate, and to attain the maximum or even a satisfactory whipping ability only after standing several hours.

It is equally characteristic of mixes stabilized with high viscosity algins to develop both their full viscosity and their maximum whippability immediately, during the cooling step, thus avoiding any necessity for aging but also introducing the difficulties in cooling and handling above described.

Mixes stabilized with low viscosity algins behave like mixes stabilized with high viscosity algins in the immediate development of maximum whippability, which permits them to be frozen as soon as cooled, but they also resemble the gelatin mixes in increasing in viscosity after cooling.

This remarkable behavior, for which there is no present explanation, is illustrated by the experimental results tabulated below, in which eight of the samples used in the cooling tests (groups 1, 2, 4 and 6 of Table 1) were aged at 40° Fahr., repeating the taking of pipette viscosities at intervals. As in the experiments of the first table, these viscosities are in seconds and are arbitrary, but are comparative for this group of tests.

*Table 4*

| Sample | Composition Type | Viscosity in seconds after aging ||||||
|---|---|---|---|---|---|---|---|
| | | Initial | ¼ hr. | ½ hr. | 1 hr. | 24 hrs. | 48 hrs. |
| No. 1 | New | 25 | 35 | 36 | 38 | 42 | |
| | Old | 47 | 52 | 52 | 52 | 52 | |
| No. 2 | New | 26 | 35 | 37 | 38 | 44 | |
| | Old | 47 | 47 | 45 | 45 | 44 | |
| No. 6 | New | 32 | 48 | 51 | 52 | 67 | 67 |
| | Old | 51 | 52 | 48 | 48 | 49 | 49 |
| No. 4 | New | 42 | 61 | 63 | 65 | 76 | 81 |
| | Old | 62 | 62 | 59 | 58 | 60 | 60 |

Little difference was observed in the whippability of the mixes, those stabilized with the new composition appearing to whip slightly faster than those stabilized with the old, which may be the result merely of the lower viscosity. The experiment shows, however, that for whatever reason the effect of the low viscosity algins differs radically from that of the high viscosity algins, and in a rather surprising direction.

UNIFORMITY OF STABILIZATION

The mixes used in the experiments of Table 4 were frozen in a six quart, counter type freezer to 100% overrun in seven to eight minutes, and were hardened in the usual manner. Pint cartons of the resultant ice creams were submitted to the customary heat shock and shrinkage tests, by holding the frozen samples for about two weeks in a cabinet in which the temperature was allowed to fluctuate between 0° and 15° Fahr.

The stored samples showed substantially no shrinkage or ice crystal growth; all of the ice creams were of good body and texture, and no distinctions could be found between the products stabilized with algins of different viscosities.

DEFINITIONS AND LIMITATIONS

As already stated, the basic distinction between the alginate stabilizer heretofore produced and that contemplated herein lies in the substitution of an algin yielding solutions of relatively low viscosity for the previously used algins yielding solutions of much higher viscosity at the same concentration. This substitution may require some change in the percentage composition of the blended stabilizer.

The alginate used in making the new composition may be any one of the water-soluble (alkali metal, magnesium or ammonium) alginates, though in practice the sodium salt of alginic acid is preferred and is used almost exclusively.

Alginic acid is a long chain polymer of anhydro-D-mannuronic acid residues, the viscosity of an aqueous solution of given concentration increasing as the chain length increases. As the acid may readily and progressively be depolymerized and thereby reduced in chain length, it is possible to prepare or to select an alginic acid having any desired viscosity producing value.

Alginic acid is entirely insoluble in water and the first step in ascertaining its "viscosity" (meaning its relative ability to produce viscous aqueous solutions) is to convert the acid to the form of a water-soluble salt.

The usual procedure is to dissolve the wet acid (about 20% solids) in concentrated aqueous ammonia to produce a solution of ammonium alginate, a solution of a sodium polyphosphate being added to sequester any alkaline-earth or heavy metal ions which might impart a false viscosity by forming a gel. The ammonium alginate solution is finally brought to a definite concentration, as for example 1% by weight of dry alginic acid, and the viscosity of the solution is determined in any preferred manner, the determinations referred to herein being by the Woolwich method.

The Woolwich reading is obtained by timing, in seconds, the fall (subsidence) of a $\frac{1}{16}$" steel ball through a vertical distance of 15 centimeters in a solution maintained at 20° cent. On this scale the viscosity of water is materially less than one second and the readings on solutions of very low viscosity become uncertain. For this reason it is customary to take the Woolwich viscosity of high viscosity algins on solutions of low concentration and of low viscosity algins at a higher concentration.

A statement of the viscosity of alginic acid must include both the concentration at which the viscosity was determined and, unless clearly understood, the base with which the acid was combined. The alginic acid viscosities recited herein refer to the ammonium salt of the acid.

The alginic acid heretofore used in the manufacture of the old composition has had a viscosity as above determined, in 1% solution, ranging upwardly from 20 seconds Woolwich or about 900 centipoises. The acid to be used in the product herein contemplated should have a viscosity, as above determined, not exceeding 10 seconds Woolwich in 1% solution nor less than 1.0 seconds in 5% solution, or in centipoises, at these concentrations, within the range from about 500 to about 40.

The upper limit herein fixed is critical—if it be materially exceeded the desired improvement over the properties of the old product will not be realized. The lower limit is one of practical utility only.

As the acid is reduced in chain length the stabilizing effectiveness progressively decreases though it does not disappear at any low viscosity so far reached. Within the limits fixed, the decrease in unit effectiveness may be compensated by increasing the quantity used, while below the lower limit the quantities required become impracticably large, as will be brought out in ensuing reference to percentage compositions. Thus the lower limit fixed herein is preferred as keeping the product within the range of practical utility, but is not functionally critical.

The viscosity of the alginic acid used offers a useful guide in manufacture, but as it is difficult if not impossible to regain the acid from an alginic salt without materially changing its properties, this figure is useless for the purpose of standardizing the final product. For this purpose recourse must be had to a viscosity reading on the finished stabilizing blend.

The new composition is formed from a selected alginic acid in the general manner described by Lucas, i. e., by mixing dry sodium carbonate or its equivalent with the moist alginic acid in combining proportions, adding a suitable quantity of sugar, dextrine or other dispersing agent to the pasty mass along with the required proportion of one of the sodium phosphates, drying the mass and grinding. The finished product heretofore made has had approximately the following percentage composition:

|  | As Is | Dry Basis |
|---|---|---|
|  | Per cent | Per cent |
| Sodium alginate | 45 | 50 |
| Dispersing agent | 35 | 39 |
| Sodium phosphate | 10 | 11 |
| Water | 10 | |

These proportions do not necessarily obtain in the composition of the new product, it being possible to vary the dry weight of alginate over the range from 40% to 90% approximately, in view of the following considerations.

(a) The alginic salt is the component effective for stabilization, the other components being inert in that respect and also having substantially no influence on the true viscosity of solutions of the composition. In the upper portions of the acid viscosity range herein fixed the unit effectiveness of the alginate is fully equal to that of a higher viscosity alginate. In the lower portions of the range the unit effectiveness decreases, as above said.

(b) The limit on the quantity of any stabilizer which may be added to an ice cream mix is 0.5% of the weight of the mix, and if the unit effectiveness of the algin falls to the point at which a 50% composition fails to stabilize effectively when added in limit quantity, the proportion of alginate in the composition must be increased to compensate.

(c) The dispersing agent may be an edible sugar, dextrine or other modified starch, milk powder or any other powdered edible solid having an unobjectionable flavor. Its function is to assist the solution of the algin in the mix by dispersing and separating its particles and, incidentally, to aid in standardizing the stabilizing value of the composition. The dispersing agent, which is especially desirable at the higher viscosity levels, may be reduced or entirely omitted as it is not active in stabilizing the mix.

(d) The function of the sodium phosphate in the old composition is to solubilize the algin or, more accurately, to permit it to dissolve completely in milk, by buffering the calcium ions of the milk and thus hindering the formation of insoluble calcium alginate. The preferred agents for this purpose are alkali metal phosphates such as trisodium phosphate, sodium tetraphosphate or sodium hexametaphosphate, but other agents performing the same function, as for example sodium carbonate or sodium caseinate, may be used. In general terms, this agent may be any soluble salt of an acid of which the calcium salt is substantially insoluble or undissociated in water and of which the cation does not precipitate algin. With this explanation, this component of the composition may be referred to broadly as a solubilizing salt.

The proportion of the solubilizing salt, which in some quantity is an essential component of the blend, will obviously vary with the nature of the specific salt used and also, to a less degree, with the relative compatibility of the alginate with calcium salts, the lower viscosity algins being somewhat less susceptible to calcium precipitation than those of higher viscosity. It is thus impossible to fix a definite limit to the proportion of solubilizing salt, though it is good general practice to use it in a proportion of about 10% of the dry weight of the composition, thus allowing some latitude to compensate variables in the mix itself.

Thus we may have, at one end of the viscosity range, a composition containing about 40% dry weight of alginate, 50% dispersing agent and 10% solubilizing salt, and at the other end of the range a composition containing about 90% alginate and 10% solubilizing salt, with no dispersing agent.

To take care of the possible wide variation in percentage composition, the new product may be standardized either on the viscosity of solutions containing a known proportion of the composition as a whole, or on the viscosity of solutions containing a known quantity of alginic acid (a figure which is readily obtainable).

The composition heretofore produced, containing about 45% dry weight of sodium alginate (equivalent to 40% of alginic acid) has yielded aqueous solutions at 6% total concentration (or 2.4% alginic acid concentration) ranging upwardly from 200 seconds Woolwich viscosity or about 7000 centipoises.

By contrast, the modified composition contemplated herein, when made to 45% dry weight sodium alginate content (40% alginic acid content) should yield aqueous solutions at 6% total concentration (or 2.4% alginic acid concentration) having Woolwich viscosities not exceeding 100 seconds or about 4000 centipoises.

When the composition is made to other than 40% alginic acid content in the form of any water soluble alginate, it may be standardized at a maximum Woolwich viscosity of 100 seconds in a solution of 2.4% alginic acid concentration. By preference, the minimum viscosity of an aqueous solution of the composition at 10% alginic acid concentration should be 2 seconds Woolwich.

A simple determination of the viscosity of an aqueous solution of the composition may under some circumstances be sufficient. If stabilization tests show that an ice cream mix is stabilized sufficiently by adding not to exceed 0.5% by weight of the composition, the above described benefits resulting from the reduction of viscosity will follow if the viscosity of an aqueous solution of the composition at 6% total concentration does not exceed 100 seconds Woolwich.

It will be understood that in making these viscosity determinations it is essential to add a sodium or other alkali metal polyphosphate in quantity sufficient to avoid the possibility of a false viscosity reading resulting from gelation.

There is no exact correlation between water viscosity and milk viscosity, though there is close parallelism and the divergences are much slighter in the low than in the high viscosity range. Milk viscosities are customarily taken at a concentration approaching that at which the stabilizing composition is used in the mix, for example at 0.3% of the "as is" composition, equal to 0.135% sodium alginate or 0.122% alginic acid. The Woolwich figure becomes inaccurate at this extreme dilution and the milk viscosity is usually taken by the use of a 100 cc. calibrated pipette, preferably one having a range from 1 to 8 centipoises, and expressed in centipoises.

The compositions heretofore made and containing about 50% sodium alginate "as is" have produced skim milk viscosities, in 0.3% total concentration, ranging upwardly from 5.0 centipoises to or even above 6.0. The milk viscosity of the new composition contemplated herein, in a concentration equivalent to 0.122% as alginic acid, should not exceed 4.8 centipoises, is preferably between 4.2 and 3.5 centipoises, and may be as low at 2.3 centipoises. These viscosities are as determined in the experiments summarized in Table 2.

Milk soluble alginates having pH values in water solution as low as 5.5 have been made by substantially eliminating heavy metal impurities such as iron and calcium from the algin. The milk solubility of the alginates increases as the proportion of such impurities is reduced and also as the pH value is raised. It is possible, therefore, to produce a milk soluble alginate containing relatively large proportions of calcium or similar impurities by keeping the pH of the composition sufficiently high. In practice it should not be less than pH 7 and I prefer a product of about pH 9 in aqueous solution.

I claim as my invention:

1. An ice cream stabilizing composition comprising as its essential stabilizing component about 40 to about 90% of a water-soluble salt of partially depolymerized low viscosity alginic acid, said salt characterized in that an aqueous solution thereof yielding a concentration equivalent to 2.4% alginic acid has a Woolwich viscosity not exceeding 100 seconds.

2. An ice cream stabilizing composition comprising as its essential stabilizing component about 40 to about 90% of a water-soluble salt of partially depolymerized low viscosity alginic acid, said salt characterized in that an aqueous solution thereof yielding a concentration equivalent to 2.4% alginic acid has a Woolwich viscosity not exceeding 100 seconds, and a minor proportion of a solubilizing salt of an acid of which the calcium salt is substantially insoluble in water and of which the cation does not precipitate algin.

3. An ice cream stabilizing composition comprising as its essential stabilizing component about 40 to about 90% of a water soluble salt of partially depolymerized low viscosity alginic acid, said salt characterized in that an aqueous solution thereof yielding a concentration equivalent to 2.4% alginic acid has a Woolwich viscosity not exceeding 100 seconds, and a minor proportion of an edible carbohydrate dispersing agent together with a minor proportion of a solubilizing salt of an acid of which the calcium salt is substantially insoluble in water and of which the cation does not precipitate algin.

4. An ice-cream stabilizing composition comprising as its essential stabilizing component a water soluble low viscosity alginate of partially depolymerized alginic acid, said alginate being characterized by a chain length sufficient to produce a Woolwich viscosity of less than 100 seconds when dissolved in water to a concentration equivalent to 2.4% alginic acid.

5. An ice cream stabilizing composition comprising as its essential stabilizing component a water soluble salt of a polymer of anhydro-d mannuronic acid, said polymer characterized by a chain length sufficient to produce a Woolwich viscosity of less than 100 seconds when dissolved in water to a concentration equivalent to 2.4% of the corresponding free acid.

6. An ice cream stabilizing composition comprising as its essential stabilizing component about 40 to about 90% of a water soluble salt of a polymer of anhydro-d mannuronic acid, said polymer being characterized by a chain length sufficient to produce a Woolwich viscosity of less than 100 seconds when dissolved in water to a concentration equivalent to 2.4% of the corresponding free acid, and a minor proportion of a solubilizing salt of an acid of which the calcium salt is substantially insoluble in water and of which the cation does not precipitate algin.

ARNOLD B. STEINER.

REFERENCES CITED

The following references are of record in the file of this patent:

UNITED STATES PATENTS

| Number | Name | Date |
|---|---|---|
| 2,097,231 | Lucas | Oct. 26, 1937 |
| 2,238,906 | Martell et al. | Apr. 22, 1941 |
| 2,267,911 | Grettie et al. | Dec. 30, 1941 |